CIRCUIT ARRANGEMENTS FOR PHOTO-ELECTRIC MULTIPLIER CELLS

Filed Jan. 20, 1956

Inventor
P. W. Sieber
By Glascock Downing & Seebold
Attys.

United States Patent Office 2,829,345

Patented Apr. 1, 1958

2,829,345

CIRCUIT ARRANGEMENTS FOR PHOTO-ELECTRIC MULTIPLIER CELLS

Peter William Sieber, Beckenham, England, assignor to Muirhead & Co. Limited, Beckenham, England Application January 20, 1956, Serial No. 560,439

Claims priority, application Great Britain February 28, 1955

4 Claims. (Cl. 332—3)

This invention relates to means for producing an amplitude-modulated carrier signal from a photo-electric multiplier cell. Such a signal is employed, for example, in picture-telegraph transmitters used for the purpose of transmitting tone pictures, line drawings, maps or other documents to distant points by wire or radio.

In a well known type of picture-telegraph transmitter the original picture to be transmitted is clamped around a drum and a lamp and lens system is arranged to project a spot of light on to one portion of the drum. The drum is rotated and moved axially relative to the illuminating system so that the whole surface of the picture is progressively scanned and the light emitted from the picture, which varies according to the tonal depth of the spot being scanned, is applied to the photo-cathode of the multiplier cell.

For the highest quality of transmission and reproduction it is important that the modulating frequency, that is the frequency of the light variations at the photo-cathode of the multiplier cell, shall not be transmitted. In order to balance out the modulation frequency it is known practice to use a pair of photo-electric multiplier cells operated in a push-pull or equivalent system in which the cell currents are initially adjusted to balance so that they cancel in the output.

A further requirement which applies more particularly to the transmission of tone pictures is that the degree of modulation of the carrier shall vary in linear manner with respect to the illumination of the photo-cathode.

The balanced circuit using two photo multiplier cells described above is not fully effective because of changes in the sensitivity of the photo multiplier cells. These are subject to fatigue, that is to say, the secondary emission of electrons from the dynodes or amplifying stages falls off during operation but the cells recover after a period of non-operation. In a particular cell, under specified operating conditions, the rate at which the sensitivity falls depends upon the cell's state of fatigue at the instant of switching on. After a period of rest sufficiently long to allow the cell to recover fully the initial fall in sensitivity is rapid but it becomes progressively slower with continued use. This characteristic of photo-electric multiplier cells is well known to manufacturers and users.

The rate at which fatigue develops, and its final extent, varies widely from cell to cell. If, therefore, a pair of cells is arranged in a balanced circuit and the circuit constants are initially adjusted so that a completely balanced output is obtained, the different degrees of fatigue which develop in the individual cells after a short period of use, for example an hour, will upset the balance of the circuit. It is a relatively simple matter to compensate for loss of sensitivity by increasing subsequent amplification and this may be carried out automatically, if desired, according to known principles. Readjustment to compensate for loss of balance, however, involves a complex manual operation and this ceases to be effective as soon as the cells undergo a further change relative to each other.

It is known practice to switch on a picture telegraph transmitter for an hour or two prior to making the initial balancing adjustments and subsequently to switch the machine on for a similar period before using it. By these means it is possible to mitigate the loss of balance but it is not possible to eliminate it.

An object of the invention is to provide a circuit arrangement for producing an amplitude-modulated carrier signal in which a balanced output is obtained from a single photo-electric multiplier cell so that fatigue in the cell affects both halves of the balanced output circuit equally and the balance itself is not disturbed.

A further object is to provide a circuit and method of operation by which a balanced amplitude-modulated carrier signal, whose amplitude has a substantially linear relationship with the illumination of the photo-cathode, is derived from a single photo-electric multiplier cell.

Another object is to provide a simplified circuit for producing a balanced amplitude-modulated carrier signal.

The invention consists of a circuit arrangement for producing an amplitude modulated carrier signal comprising a photo-electric multiplier cell, having two output electrodes, connections respectively from the two output electrodes for applying potentials to the output electrodes, means for injecting an unmodulated carrier in anti-phase into said two connections so that the direct currents flowing in them are varied in sympathy with the carrier frequency without altering the total cell current and output means connected in said two connections in such a manner that no output voltage appears while the carrier is absent but, when the direct currents in the two connections are varied by the application of the carrier, a voltage at carrier frequency appears in the output means whose amplitude depends on the intensity of illumination of the photo-cathode.

In this way the signal derived from the output means is of the same frequency as the carrier, and its amplitude is proportional to the illumination of the photo-cathode of the multiplier cell but the modulating frequency does not appear in the output signal.

If, due to leakage paths in particular output means, a small output signal appears at carrier frequency when no light is falling upon the photocathode of the multiplier cell then, according to a feature of the invention, balancing means are provided to eliminate this no-signal output.

The invention will be further described with reference to the accompanying drawings in which.

Figures 1, 2:
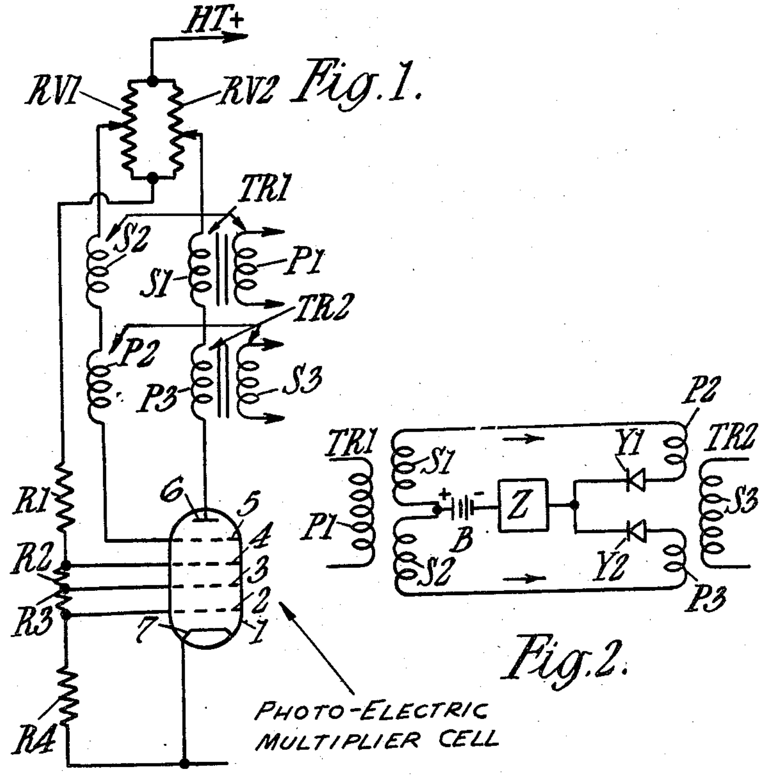
Figure 1 is a circuit diagram showing, by way of example, a practical embodiment of the invention.
Figure 2 is a simplified diagram to assist in explaining how the invention functions.

Referring to Figure 1, the photo-electric multiplier cell 1, has dynodes 2, 3, 4 and 5, in addition to the anode or collector 6 and cathode 7.

Cathode 7 is connected to HT— and by means of the voltage dividing network R1, R2, R3, R4 ascending positive voltages are applied to dynodes 2, 3 and 4. The final dynode 5 is connected to HT+ through a series circuit consisting of primary winding P2 of transformer TR2, secondary winding S2 of transformer TR1 and potentiometer RV1.

Anode or collector 6 is connected to HT+ through a similar circuit consisting of primary winding P3 of transformer TR2, secondary winding S1 of transformer TR1 and potentiometer RV2. The potential difference between final dynode 5 and collector or anode 6 is such that the steady current (in the absence of a carrier)

flowing through P2 and S2 is the same as that flowing through P3 and S1, an exact balance being obtained by adjusting potentiometers RV1 and RV2. The two secondary windings S1 and S2 are so connected that there is no resultant flux due to the cell current in the transformer core. The carrier is applied to primary P1 of transformer TR1 and the output is derived from secondary S3 of transformer TR2 (or vice versa).

In order to understand the invention fully, reference should be made to Figure 2 in which transformers TR1 and TR2 correspond to those having like references in Figure 1. Block Z represents the impedance of the photo-electric multiplier cell, which is always large in relation to the other circuit impedances and varies inversely with the intensity of illumination of the photo-cathode. For the purpose of the present description the output electrodes of the multiplier cell are represented by rectifiers Y1 and Y2.

If the photo-cathode is illuminated in the absence of a carrier signal, battery B supplies a current through S1, P2, Y1 and Z and a similar current through S2, P3, Y2 and Z. The two currents flow in opposite senses through S1, S2 and P2, P3 respectively, so that the respective fields cancel each other and variations in impedance Z do not produce a signal in S3.

When a carrier is applied to P1, corresponding voltages are induced in S1 and S2 which at any instant act in the same direction. If at a given instant the voltage in S1 acts to increase the current through P2 and Y1, then the voltage in S2 opposes the flow of current through P3 and Y2 and reduces it by an equal amount, the total current through Z being unchanged. The changes in current through P2 and P3 induce a voltage in S3 at carrier frequency.

If the photo-cathode is brightly illuminated impedance Z is relatively low, the currents through the two halves of the circuit from B are relatively high and the changes in current due to the carrier voltage are correspondingly high; consequently the amplitude of the signal in S3 is high. Conversely, if the illumination of the photo-cathode is low then impedance Z is high, the current from B through the two halves of the circuit is low, the changes in current due to the voltages in S1 and S2 are also low and the amplitude of the signal in S3 is correspondingly low. If the photocathode is completely dark no current flows from B, no change occurs due to the carrier voltage and no signal appears in S3. Thus, the output signal in S3 is of carrier frequency and its amplitude has a substantially linear relationship to the illumination of the photo-cathode. The modulating frequency, that is, the frequency of the light variations on the photo-cathode of the multiplier cell, does not appear in the output.

Figure 3:
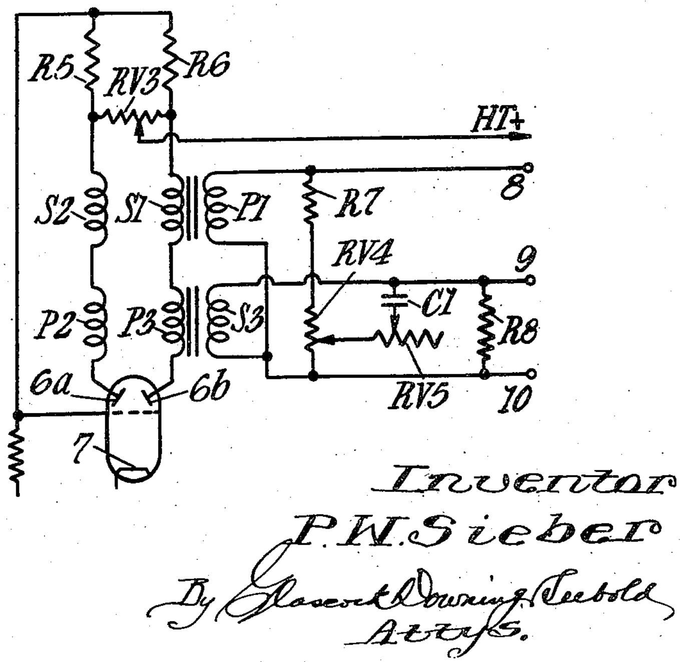
Figure 3 shows a practical embodiment which is an alternative to Figure 1.

Figure 3 shows a method of providing an amplitude-modulated carrier using a photo-electric multiplier cell having two similar anodes or collectors *6a*, *6b*, which are connected respectively to the two halves of the anode circuit. A different method of balancing the steady H. T. current in the two halves of the anode circuit is shown, together with means for balancing out the no-signal output which appears due to the self-capacitances of the transformer windings. The H. T. supply to the anode circuit is connected to the slider of potentiometer RV3 which is adjusted until the currents flowing in the two halves of the circuit are exactly equal. The carrier is applied to terminals 8 and 10.

The small signal due to stray capacitances which appears in winding S3 when no light falls on cathode 7 is balanced out by means of the resistance network R7, RV4, RV5 and R8, in conjunction with capacitor C1. A small proportion of the carrier voltage applied to P1 is tapped off (in the correct sense) by means of fixed resistance R7 and variable resistance RV4. This is applied to variable resistance RV5. The slider of RV5 is connected to capacitor C1. By means of RV4 the magnitude of the balancing voltage is adjusted and RV5, C1 and R8 form a phase-correcting circuit by which the phase of the balancing voltage is adjusted so that it is exactly in anti-phase to the unwanted voltage in S3. When the adjustments have been made correctly no voltage appears between terminals 9 and 10 when there is no illumination of photo-cathode 7. The modulated carrier is derived from terminals 9 and 10. This balancing circuit may also be applied to the arrangement shown in Figure 1.

It will be understood that variations may be made in the arrangements described above by way of example without departing from the scope of the invention. Thus, whilst for the purpose of illustration the cell is shown as having four dynodes, it will be understood that the invention may also be applied to photo-electric multiplier cells having only one dynode or to multistage cells having any other number of dynodes.

Also, a balanced output may be obtained even if the direct currents in the two halves of the output circuit are not equal, provided that the turns of wire in the two transformer primaries and secondaries which are connected respectively in the two halves of the output circuit are in inverse ratio to the direct currents.

I claim:

1. A circuit arrangement for producing an amplitude modulated carrier signal comprising a photo-electric multiplier cell having a single cathode, a single set of dynodes, and two output electrodes, connections respectively from said two output electrodes for applying potentials to said two output electrodes, means for injecting an unmodulated carrier in anti-phase into said two connections so that the direct currents flowing in said two connections are varied in sympathy with the carrier frequency without varying the current flowing between said dynodes, and output means connected in said connections in such a manner that no output voltage appears when the carrier is absent but when the direct currents in the two connections are varied by the application of the carrier a voltage at carrier frequency appears in the output means whose amplitude depends upon the intensity of illumination of the photo-cathode.

2. A circuit as claimed in claim 1 in which one of the two output electrodes is the final dynode of a photo-electric multiplier cell.

3. A circuit as claimed in claim 1 in which the two output electrodes are two similar anodes of a photo-electric multiplier cell.

4. A circuit as claimed in claim 1, comprising means for tapping off a desired small proportion of the unmodulated carrier, means for phase correcting said small portion and for connecting it in the output means in anti-phase with small signals due to stray capacitance or other leakage which appear in the output when no light falls on the cathode.

References Cited in the file of this patent

FOREIGN PATENTS 348,671 Italy ---------------- May 25, 1937